United States Patent
Leone

(10) Patent No.: US 10,029,432 B2
(45) Date of Patent: Jul. 24, 2018

(54) METHODS FOR MAKING OPHTHALMIC LENSES WITH AN AXIS POSITIONING SYSTEM

(71) Applicant: CooperVision International Holding Company, LP, St. Michael (BB)

(72) Inventor: John Leone, Penfield, NY (US)

(73) Assignee: COOPERVISION INTERNATIONAL HOLDING COMPANY, LP, St. Michael (BB)

( * ) Notice: Subject to any disclaimer, the term of this patent is extended or adjusted under 35 U.S.C. 154(b) by 252 days.

(21) Appl. No.: 14/921,632

(22) Filed: Oct. 23, 2015

(65) Prior Publication Data
US 2016/0129650 A1 May 12, 2016

Related U.S. Application Data

(60) Provisional application No. 62/078,780, filed on Nov. 12, 2014.

(51) Int. Cl.
| | |
|---|---|
| *B29D 11/00* | (2006.01) |
| *B23B 31/30* | (2006.01) |
| *B23B 31/36* | (2006.01) |
| *B24B 13/04* | (2006.01) |

(Continued)

(52) U.S. Cl.
CPC ...... *B29D 11/00942* (2013.01); *B23B 31/307* (2013.01); *B23B 31/36* (2013.01); *B24B 13/046* (2013.01); *B29D 11/00067* (2013.01); *B29D 11/00125* (2013.01); *B23B 2265/12* (2013.01); *B29K 2083/00* (2013.01); *B29K 2105/0061* (2013.01)

(58) Field of Classification Search
CPC ........ B29D 11/00942; B29D 11/00067; B29D 11/00125; B24B 13/046; B23B 31/307; B23B 31/36

See application file for complete search history.

(56) References Cited

U.S. PATENT DOCUMENTS 3,357,711 A * 12/1967 Fischer ................. B23B 31/36
    279/6
4,179,484 A * 12/1979 Neefe ................. B29C 33/3857
    264/1.36

(Continued)

FOREIGN PATENT DOCUMENTS

| EP | 0628380 | 12/1994 |
| EP | 3218173 | 9/2017 |

OTHER PUBLICATIONS

International Search Report and Written Opinion on related PCT application (PCT/GB2015/053414) from International Searching Authority (EPO) dated Feb. 2, 2016.

(Continued)

*Primary Examiner* — Galen H Hauth
(74) *Attorney, Agent, or Firm* — Klein, O'Neill & Singh, LLP

(57) ABSTRACT

Methods for making ophthalmic lenses are generally discussed herein with particular discussions extended to plastic injection molded ophthalmic lens molds that are machined or lens buttons located on the injection molds that are machined. The machine process can include setting a lens axis of the ophthalmic lens and machining a ballast that is aligned to a major axis of a toric zone.

21 Claims, 13 Drawing Sheets

(51) Int. Cl.
*B29K 83/00* (2006.01)
*B29K 105/00* (2006.01)

(56) References Cited

U.S. PATENT DOCUMENTS

| | | | | |
|---|---|---|---|---|
| 4,680,998 A | * | 7/1987 | Council, Jr. | B24B 13/00 |
| | | | | 451/163 |
| 5,528,878 A | * | 6/1996 | Edwards | B65B 25/008 |
| | | | | 53/495 |
| 5,711,196 A | * | 1/1998 | Reid | B23B 31/021 |
| | | | | 279/130 |
| 2004/0113375 A1 | | 6/2004 | Meissner et al. | |
| 2010/0109176 A1 | | 5/2010 | Davison | |
| 2013/0255453 A1 | | 10/2013 | Buck et al. | |

OTHER PUBLICATIONS

Examination Report on corresponding foreign application (GB Application No. 1709110.9) from the Intellectual Property Office dated Oct. 9, 2017.

* cited by examiner

METHODS FOR MAKING OPHTHALMIC LENSES WITH AN AXIS POSITIONING SYSTEM

Ophthalmic lens mold sections and lens buttons for making ophthalmic lenses are generally discussed herein with particular discussions extended to plastic lens molds or mold sections and lens buttons that are machined to add one or more corrections or features to the formed contact lenses, such as silicone hydrogel contact lenses. Methods of making silicone hydrogel contact lenses include using contact lens molds that have been aligned along a lens axis and then machined are also discussed.

BACKGROUND

Hydrogel contact lenses are popular due to their comfortable, soft, and hydrophilic properties compared to rigid gas permeable (RGP) contact lenses. Soft hydrogel contact lenses are often manufactured by cast molding a polymerizable lens precursor composition in a two part mold where each mold half has an optically acceptable lens-defining surface consistent with the desired final lenses. In conventional cast molding procedures, each mold half is injection molded in an injection molding apparatus and includes an optically acceptable lens-defining surface resulting from the injection molding process. Cast molding procedures are typically used to mass produce large volumes of contact lenses, including silicone hydrogel contact lenses, with a fixed number of pre-determined properties or specifications. Current cast molding procedures are not practical in producing customized toric contact lenses, such as contact lenses that are made to order based on an individual's prescription or on a limited number of prescriptions, or in producing contact lenses with properties or specifications that tend to be ordered or prescribed less frequently. For example, high volume cast molding procedures in which each mold half of a mold assembly is only injection molded and includes parameters to shape the final optical properties of the lenses is not desirable when producing less common toric lenses. Instead, customized or made to order contact lenses have been described as being produced by lathing RGP or soft lenses from polymerized contact lens buttons. In addition, lathed silicone hydrogel contact lenses have been described which include lathing the polymerized silicone hydrogel lens forming material into a contact lens, such as by U.S. Pat. No. 5,260,000 and U.S. Publication Nos. 2006/0001184 and 2006/0004165.

SUMMARY

Methods of manufacturing soft ophthalmic lenses, such as silicone hydrogel contact lenses, as well as methods of manufacturing ophthalmic lens mold sections and lens buttons to form ophthalmic lenses have been invented. Utilizing the present methods, it is possible to produce customized or made-to-order contact lenses in a more cost effective manner than using conventional cast molding techniques. It is also possible to cost-effectively produce contact lenses, such as silicone hydrogel contact lenses, with toric lens specifications, such as prescriptions and the like, that are somewhat complicated to produce in a cost-effective manner using conventional cast molding and machining processes. For example, where lenses have a toric zone and a ballast, the present methods of manufacturing can more efficiently form mold sections that can then be used to form the final ophthalmic lenses with precise prescriptions.

An exemplary aspect of the present disclosure includes a method for producing an ophthalmic lens using a unique mandrel. The method can comprise: providing a plastic mold section having a lens button with a posterior surface comprising a toric zone with a major axis; mounting the plastic mold section onto a mandrel, said mandrel having a flywheel, a base unit, and a projection having a rotational axis that is offset from a rotational axis of a lathe assembly; fixing the flywheel to a first reference point with an aligner so that the first reference point is at a first radian position; rotating the base unit relative to the flywheel so that a second reference point is at a second radian position; and fixing the flywheel and the base unit from rotating relative to one another.

The method wherein the first radian position can correspond to an axis position of the major axis.

The method wherein the step of fixing the flywheel to the first reference point can comprise actuating an aligner.

The method wherein the aligner can include a strike plate that translates when the aligner is actuated.

The method wherein the aligner can comprise a pneumatic block comprising a stationary block and a movable block that moves relative to one another when the aligner is actuated.

The method wherein the step of fixing the flywheel and the base unit from rotating relative to one another can comprise using a vacuum.

The method wherein the second radian position can set an area on the lens button to be machined by a cutting tool.

The method wherein the area to be machined can correspond to a ballast zone.

The method can further comprise machining the lens button to form a front curve of the ophthalmic lens.

Another aspect of the present disclosure includes a method for producing an ophthalmic lens comprising: providing a plastic mold section having a lens button with a posterior surface having a toric zone with a major axis; mounting the plastic mold section onto a projection on a mandrel, said mandrel having a flywheel, a base unit, and the projection has a rotational axis that is offset from a rotational axis of a lathe assembly; fixing a reference point on the flywheel to a first radian position; rotating the base unit relative to the flywheel so that a second reference point on the base unit is at a second radian position; and applying a vacuum to fix the flywheel and the base unit from rotating relative to one another.

The method wherein at least part of the plastic mold section can be exposed to the vacuum.

The method wherein vacuum can be applied through a bore that runs lengthwise through the mandrel.

The method wherein the first radian position can correspond to an axis position of the major axis.

The method wherein the second radian position can set an area on the mold section to be machined by a cutting tool.

The method wherein the area to be machined can be a ballast zone.

Yet another aspect of the present disclosure includes a method for producing an ophthalmic lens mold section, comprising: providing a plastic mold section having lens button with a posterior surface having a toric zone with a major axis; mounting the plastic mold section onto a mandrel, said mandrel having a flywheel, a base unit, and a projection having a rotational axis that is offset from a rotational axis of a lathe assembly; setting the major axis of the toric zone to a first radian position by fixing the flywheel from rotating; setting a reference point on the base unit of the mandrel to a second radian position, which sets an area on the lens button to be machined by a cutting tool; and fixing the first radian position and the second radian position relative to one another.

The method can further comprise rotating the mandrel with the first radian position and the second radian position fixed to one another.

The method wherein the fixing step can comprise the use of a vacuum.

The method wherein the area on the lens button to be machined can comprise a ballast zone.

The method can further comprise machining the lens button to form an anterior surface of the ophthalmic lens.

The method can further comprise the step of packaging the ophthalmic lens in a storage solution inside a cavity of a lens package.

DETAILED DESCRIPTION

Figure 1:
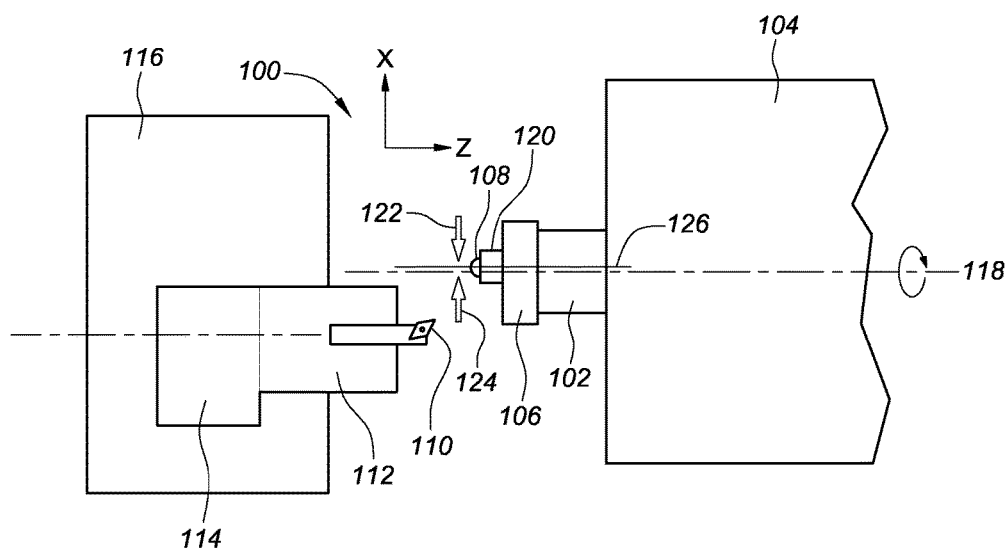
FIG. 1 is a schematic top view of a lathe assembly in which a work piece is held offset from the lathe's rotational axis.

The detailed description set forth below in connection with the appended drawings is intended as a description of the presently preferred embodiments of methods for forming ophthalmic lenses. It is not intended to represent the only forms in which the present invention may be constructed or utilized. The description also sets forth the features and the steps for constructing and using machined lens mold sections with a mandrel to form ophthalmic lenses. It is to be understood, however, that the same or equivalent functions and structures may be accomplished by different embodiments that are also intended to be encompassed within the spirit and scope of the invention.

As used herein, reference to "first" and "second" is relative and made to distinguish two different elements or components only and not to be structurally limiting unless the context indicates otherwise.

Commercially available lathe assemblies are capable of cutting along 2, 3, 4 or more axes. In general, lathe assemblies capable of rotary cuts and interpolated cuts are preferred. Especially preferred are lathe assemblies that can perform rotationally symmetrical or rotationally non-symmetrical cuts. Other lathe assemblies useable in lathing the preferred lens mold sections described herein include those that are configured for fly cutting wherein the cutting tool, such as a diamond tip or diamond blade, is held in a spindle and the stock or component to be lathed is held to one of the cutting axes. Exemplary lathe assemblies are disclosed in U.S. Pat. Nos. 4,455,901 and 4,680,988 both to Council, Jr., the contents of which are expressly incorporated herein by reference. A particular lathe apparatus for making toric lenses is the general type made by Rank Pneumo, a division of Rank Taylor Hobson of Keene, N.H. As this lathe apparatus is commercially available and known, a complete description of all of its construction details is not necessary. The lathe apparatus includes a base and a spindle housing supported thereupon. The spindle housing houses and supports a rotatable spindle driven by a motor means for rotating the spindle. As is known, the lathe apparatus also includes sensor means for detecting the instantaneous angular position of the spindle for coordinating the movements of the cutting tool. Another lathe useful in the present methods is an Optoform lathe available from Sterling Ultra Precision (Florida, US or Buckinghamshire, United Kingdom).

The lathe apparatus also includes a two-axis movable bed or quadrant. A tool holder is supported by a tool holder support housing, which in turn is mounted to the quadrant. The tool holder support housing houses internal oscillation means for oscillating the tool holder back and forth in the direction along an oscillation axis. In this way, a cutting tool, which is mounted to the tool holder, is oscillated back and forth along the oscillation axis to machine a surface for cylindrical correction.

A chuck is mounted at the end of the spindle for supporting a lens mold section blank or workpiece, which in accordance with aspects of the present invention includes a mold section. The spindle rotates the workpiece, mold section, or mold section blank about the rotational axis of the spindle. As the workpiece rotates about the rotational axis of the spindle, the quadrant moves through a predetermined path using conventional CNC (Computer Numerical Control) principles. In doing so, the quadrant moves in the X and Z axes so that the cutting tool mounted on the quadrant performs cuts on the workpiece.

With reference now to FIG. 1, a lathe assembly 100 provided in accordance with aspects of the present disclosure is shown, which comprises a spindle 102 supported by a spindle housing 104. A chuck 106 located on the spindle 102 holds a lens mold section or workpiece 108, which may have its first lens defining surface (e.g., concave surface) or its second lens defining surface (e.g., convex surface) facing in the direction of a cutting tool 110. The workpiece 108 may also be a lens button mounted on a lens mold section and the mandrel holding the lens mold section and presenting the lens button to the cutting tool 110 for cutting or lathing the lens button, such as to form an anterior or posterior surface of an ophthalmic lens from the lens button. The cutting tool 110 is mounted to or on a tool holder 112, which is positioned on a quadrant arm 114, and which is positioned on a quadrant 116. The spindle 102 is designed to rotate about a rotational axis 118 and the cutting tool 112 may be traversed along the X and Y axes and rotates angularly around an axis defined by the quadrant 116.

As further discussed below, the lathe assembly 100 may be used to machine a ballast zone on a lens defining surface of a contact lens mold that is subsequently used to form a ballast on an ophthalmic lens. The lathe assembly 100 may also be used to lathe a lens button mounted on a lens mold section to form an anterior or posterior surface of an ophthalmic lens with optional lens features, such as an inversion mark. The lathe or lathe assembly is also useable to form a ballast zone on a contact lens mold having a pre-formed or injection molded toric zone for use to form an ophthalmic lens having a toric region having an elliptical shape with a major axis and a minor axis. As further discussed below, a lens button having a posterior surface formed by lens casting may also be machined with the lathe to form the front or anterior surface of the completed ophthalmic lens. The posterior surface may further include a toric zone and the machined anterior surface may include a ballast zone that is machined based on the orientation of the major axis of the toric zone. As shown, a mandrel 120 is coupled to the spindle 102, such as being held by the chuck 106. The mandrel 120 is used to hold the work piece 108 so that the work piece can be turned by the spindle about the rotational axis 118. This in turn allows the work piece 108 to be lathed with the cutting tool 110. The mandrel can be configured to hold a male mold section in which the convex lens defining surface of the mold section faces the cutting tool or to hold a female mold section in which the concave lens defining surface of the mold section faces the cutting tool. The mold section can have a lens button mounted thereon so that the lens button faces the cutting tool and be machined by the tool.

In accordance with aspects of the present disclosure, the mandrel 120, or at least part of the mandrel, has a central axis that is offset from the rotation axis 118 of the lathe assembly 100. The mandrel or the part of the mandrel that is offset from the rotation axis has a different axis, called the mandrel axis 126, and is offset and parallel to the rotation axis 118. The offset amount is represented by the two arrows 122, 124 and can vary depending on the size of the work piece and the desired offset area produced at a particular angular position by the offset. For a typical contact lens mold section, the offset range can vary from about 0.05 mm to about 0.6 mm between the mandrel central axis and the rotational axis of the lathe assembly with about 0.1 mm to about 0.3 mm being more preferred. The offset allows the work piece 108 to be machined by the cutting tool 110 in a non-symmetrical manner, such as on a particular section of the mold section or lens button, as compared to machining a circular section of the work piece when it rotates about the rotational axis 118 of the spindle without any offset.

Figure 2:
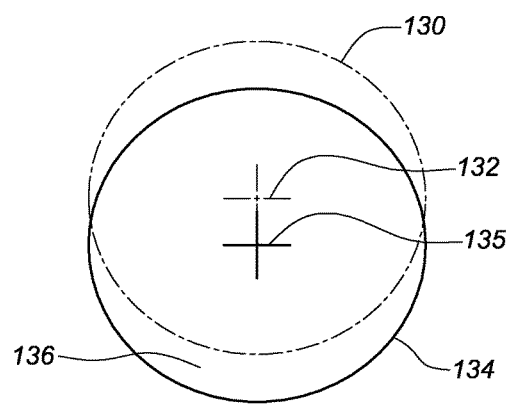
FIG. 2 is a schematic front view showing the work piece of FIG. 1 in the offset position compared to a hypothetical concentric position.

With reference to FIG. 2, two circular rotational patterns are shown, one with dashed lines 130 and a central axis 132 and the other with a solid line 134 and a central axis 135. The first circular pattern 130 with the dashed lines represents a path that a round work piece makes when spinning about the central axis 132, which corresponds to or is common to the rotational axis 118 of the lathe assembly 100. The second circular pattern 134 represents a path that a round work piece makes at the particular angular position of the spindle where the central axis 135 is offset from the rotational axis 118. The offset amount creates an offset area 136 that can be used to machine just that section or area of the work piece and not the entire circumference of the work piece when it is mounted concentric to the rotational axis of the lathe. Thus, as an example, when a mold section having a convex lens-forming surface for forming a base or posterior surface of a contact lens is rotated with the offset mandrel 120 is machined at the offset area 136 and subsequently used with a second mold section with a lens forming material in a lens shaped cavity defined by the two mold sections, the machined offset area creates a relatively thicker section on the contact lens formed by the process, which can function as a prism ballast to stabilize the lens when worn. The offset area thus allows for a quick and efficient way to isolate the area to be machined. For a lens button mounted on a mold section to be machined by the lathe assembly, the common area 139 can be machined to form an anterior lens surface of an ophthalmic lens and the offset area 136 can be machined, such as to shaped or refined by the cutting tool, to form a lens feature, such as a prism ballast.

Figure 3A:
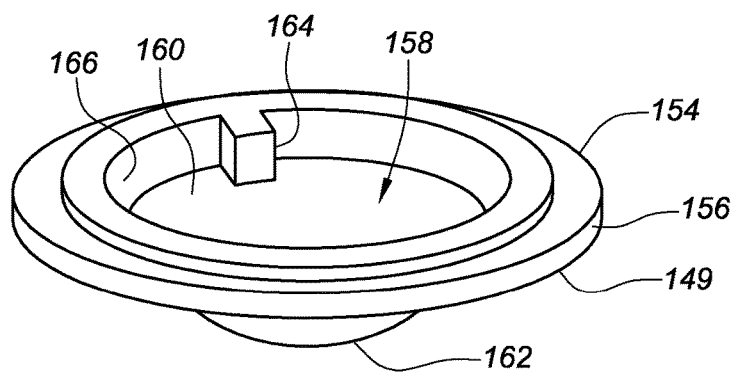
FIG. 3A is a perspective view of a lens-mold section that is useable as a work piece and that can be machined by the lathe assembly of FIG. 1.

FIG. 3A is a perspective view of a mold section 150 provided in accordance with aspects of the present invention. The mold section 150 may be used as the work piece 108 when mounted to the mandrel 120 as shown in FIG. 1. In an example, the mold section 150 comprises a body section 149 comprising a flange region 154 and an outer concentric shoulder 156. The flange region 154 at least partially circumscribes an optic region 158 having a first lens defining surface 160, which is a concave lens defining surface, and an opposed second lens defining surface 162, which is a convex lens defining surface. A tab or key 164 along the interior flange section 166 of the mold section 150 for alignment with a mandrel and/or to a second mold section, as further discussed below.

Two mold sections 150 when combined form a mold assembly having a lens defining cavity therebetween for forming a contact lens. Depending on how a particular mold section 150 is used, the first lens defining surface 160 may be considered a female concave surface for forming the front curve or anterior surface of an ophthalmic lens when it receives a convex second lens defining surface 162 of another mold section 160. When assembled in this configuration, the second lens defining surface 162 is considered a convex surface for forming the back curve or posterior surface of an ophthalmic lens. Further aspects of the mold section 150 and mold assemblies for casting ophthalmic lenses are disclosed in U.S. Pat. No. 7,320,587, entitled "CONTACT LENS MOLDS AND SYSTEMS AND METHODS FOR PRODUCING SAME", the contents of which are expressly incorporated herein by reference.

Although the single mold section 150 illustrated in FIG. 3A has two lens defining surfaces 160, 162, other mold sections useful with the present methods may only have one lens defining surface, meaning a surface that provides an optical quality surface to a lens formed against the lens defining surface. The lens defining surface can either be concave or convex depending on which mold section is being referred to. The surface opposing the lens defining surface on a single mold section does not need to be an optical quality surface. Thus, in accordance with the present methods, a single mold section may have only one lens defining surface, which has been shaped by lathing a portion of the surface. That lathed portion forms a front surface or back surface of a hydrogel contact lens, such as a silicone hydrogel contact lens.

Figure 3B:
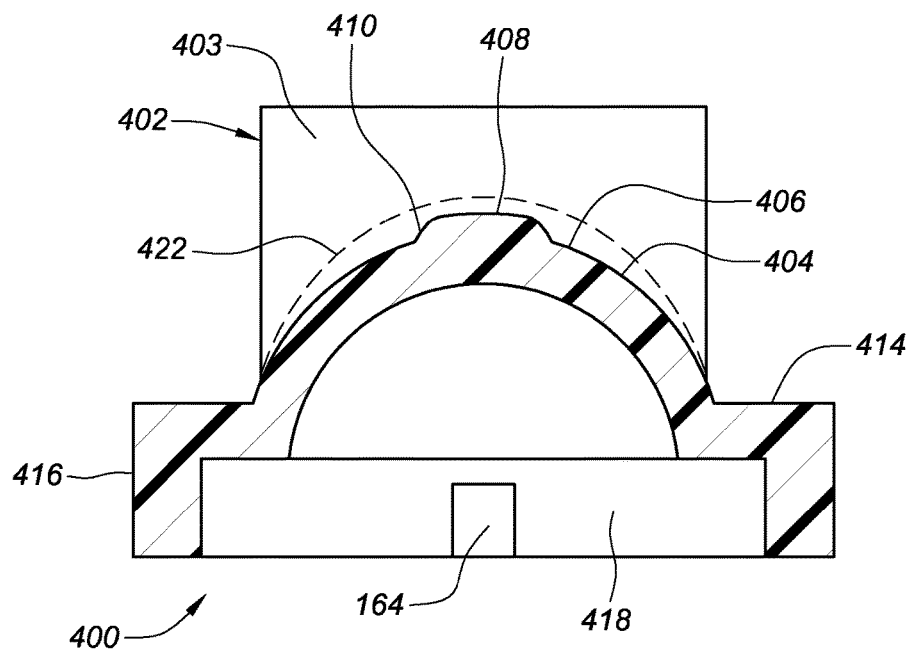
FIG. 3B is a cross-sectional side view lens-mold section having an ophthalmic lens button positioned over the convex surface of the lens-mold section.

FIG. 3B is a perspective view of a mold section 400 provided in accordance with further aspects of the present invention, which has an ophthalmic lens button 402 located on the convex lens defining surface 404. The combination mold section 400 and lens button 402 may be used as a work piece 108 when mounted to the mandrel 120 as shown in FIG. 1. Alternatively, the lens button 402 may be mounted onto the lens mold section 150 of FIG. 3A. The lens button 402 of the present embodiment may be cast molded onto the mold section 400 so that the convex lens defining surface 404 of the mold section forms the back curve or posterior surface 406 of the lens button 402, including any prescription or correction provided on the convex lens defining surface, such as the lens power. After formation of the lens button 402, the mated mold section of the mold assembly is removed leaving the lens button 402 with the stock area 403 for machining adhered to the mold section 400 to be further processed.

FIG. 3B also shows a raised section 408 on the convex lens defining surface 404 for forming a toric zone 410 on the posterior surface 406 of the lens button 402. The toric zone 410 is elliptical in shape has a major axis and a minor axis and wherein the major axis can be aligned to a reference point on the mold section 400, such as to the tab or key 164. The mold section 400 further comprises a flange region 414 having a shoulder 416 depending therefrom. The shoulder 416 defines an interior cavity 418 and has the tab or key 164 located therein for alignment and/or engagement purposes, as further discussed below.

The shoulder 416 is configured to fit around a mandrel and held by the mandrel so that the lens button 402 may be lathed or machined by the cutting tool 110. For example, the lens button may be lathed so that the stock material or area 403 can be machined down to its final shape to form the front curve or anterior surface of an ophthalmic lens, which is represented by the dashed lines 422. Thus, while the lens mold section 150 of FIG. 3A is configured to be lathed directly by a cutting tool, the lens mold section 400 of FIG. 3B is configured to support a lens button 402 having an optical quality lens surface or back curve 406 and the stock area 403 of the lens button 402 is machineable by a cutting tool to form the front curve or anterior surface 422 of an ophthalmic lens. The front curve to be formed 422 can also be machined to incorporate other lens features, such as a ballast and an inversion mark.

Figure 4:
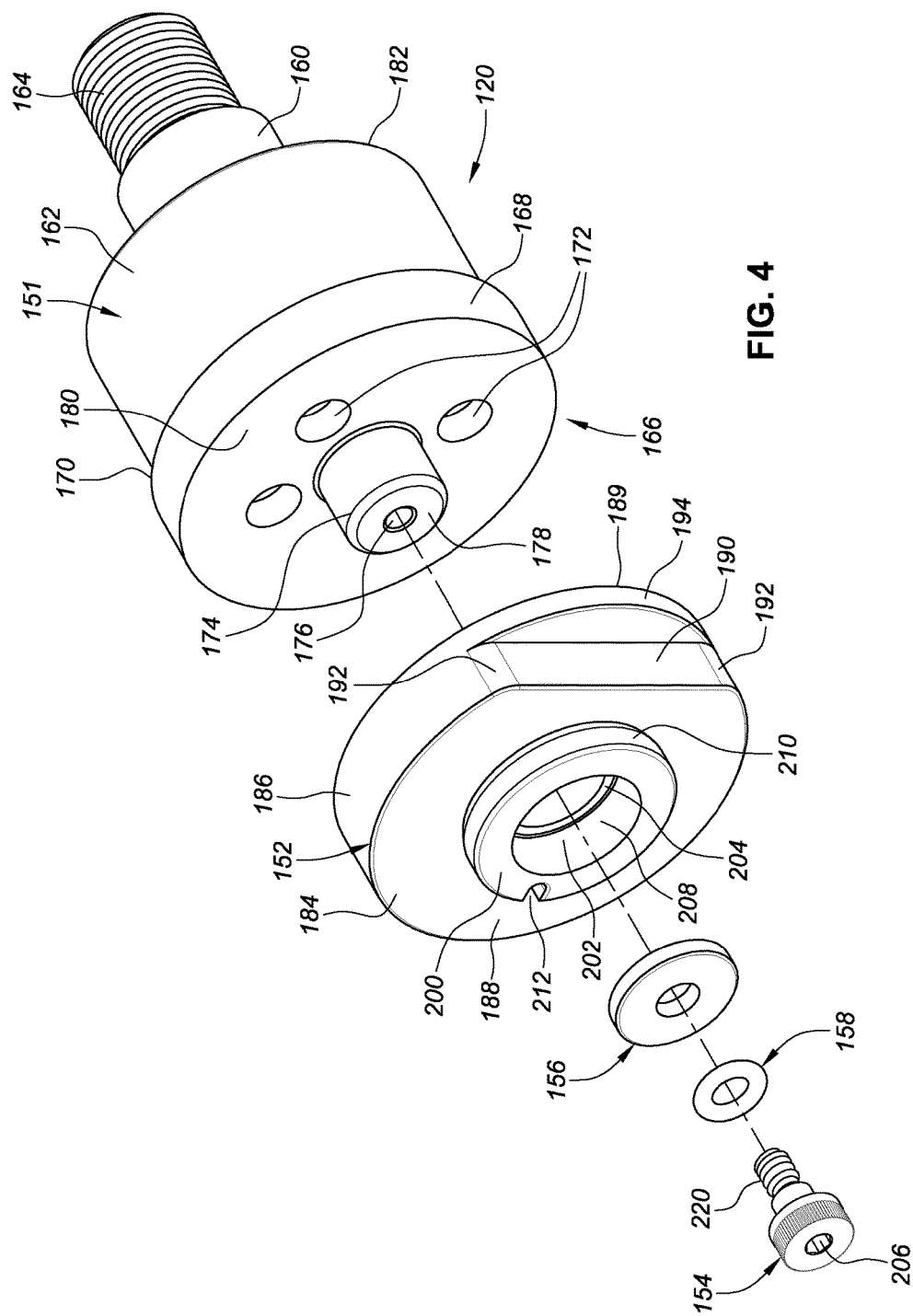
FIG. 4 is an exploded perspective view of a mandrel provided in accordance with aspects of the present disclosure.

With reference now to FIG. 4, an exploded perspective view of a mandrel 120 provided in accordance with aspects of the present devices, systems, and methods is shown. The mandrel 120 comprises a base unit 151 and a flywheel 152 that can be held together with a fastener 154, a washer 156, and a lock washer 158, which can be a Belleville washer. The base unit 151 comprises a stem 160 extending from a base body 162 for use by gripping fingers on the chuck 106 (FIG. 1) to grip the base unit. Male threads 164 may optionally be incorporated to thread the stem 160 into a threaded bore located on the chuck 106 or to an adaptor that is held by the chuck or the chuck itself. The base body 162 is generally cylindrical in shape and has a coupling end 166 for connecting to other peripheral devices, such as the flywheel 152. For example, the present flywheel 152 is configured for holding a mold section with a convex lens defining surface facing the cutting tool or for holding a lens button that is configured to be machined to form the front curve or back curve of an ophthalmic lens, such as that shown in FIG. 3B. However, a different flywheel may also be used with the base unit 151 for holding a mold section with a concave lens defining surface facing the cutting tool. A flange 168 is provided by enlarging an end section of the base body 162, which forms a shoulder 170 therebetween.

Although the flange 168 and the base body 162 are generally round in shape, other shapes are contemplated without deviating from the spirit and scope of the present disclosure. The mandrel 120 may be made from a metal material, such as from steel or aluminum material. Optionally, the mandrel may be made from a hard thermoplastic material, such as polycarbonate (PC), acrylonitrile butadiene styrene (ABS), polyetheretherketon (PEEK), or similar hard plastics.

A plurality of through bores 172 are provided around an extending boss or projection 174, which also has a through bore 176. The plurality of through bores 172 may be referred to as anchoring bores 172 and are generally equally spaced from one another around the projection 174. In the example shown, four anchoring bores 172 are provided. In other examples, 2, 3, 5 or more through bores 172 may be incorporated. The anchoring bores 172 have openings at the coupling face 180 and corresponding openings at the rear face 182 of the base body 162. The bores 172 may be used with fasteners, such as threaded screws, to secure the base unit 151 to the chuck 106 and thus may be equipped countersinks and/or counterbores to recess the fastener heads.

In one example, the boss or projection 174 has a central axis that is either concentric with or offset from a central axis of the base unit 151. If concentric, then the peripheral device, such as the flywheel 152, has a component that has a central axis that is offset from the central axis of the base unit 151 so that the work piece 108 may be rotated off axis relative to the rotational axis 118 of the lathe assembly. If the boss 174 has a central axis that is offset from the central axis of the base unit 151, then the peripheral device may have a central axis that is concentric to the axis of the boss 174 to rotate the workpiece 108 off axis relative to the rotational axis 118 of the lathe assembly. The projection 174 has an elongated surface that may slightly taper inwardly towards the nose end 178 to facilitate coupling with a peripheral device.

The through bore 176 formed through the projection 174 extends through the stem 160 and has an opening at the rear surface of the stem. The through bore 176 is configured to communicate with a vacuum source located in or associated with the lath assembly 100 for providing a vacuum through the bore and to the projection 174. As further discussed below, vacuum is then used to fix an angular position between the base unit 151, a peripheral device, such the flywheel 152, and a lens mold section mounted to the peripheral device. The lens mold section can be machined directly by a cutting tool or it can hold a lens button to be machined by the cutting tool to form a front or back curve of an ophthalmic lens. In another embodiment, a mechanical means, such as a tab, a key, or a fastener, is used to fix the angular position between the base unit and the peripheral device. In yet another example, both a vacuum and a mechanical means are used to fix the angular position.

As shown, the peripheral device is a flywheel 152 comprising a body 184 comprising a sidewall 186, a coupling end 188, and a rear face 189. In other examples, the peripheral device can be a machineable work piece, such as a mold stock, a lens button or an adaptor for engaging or grabbing other devices. A planar brake surface 190 is provided across a section of the sidewall 186 with optional reliefs 192 at the two side edges to eliminate sharp corners. In one example, the planar brake surface 190 is provided through the entire depth of the sidewall 186. As shown, the planar brake surface 190 is provided through only part of the depth of the sidewall 186 and the sidewall has at least a rear sidewall section 194 that extends a full circumference of the peripheral device. In another example, a second planar brake surface is provided, which can be located opposite the first planar brake surface around the periphery of the sidewall, such as that shown with reference to FIG. 8.

A boss or projection 200 is provided with the flywheel 152, which has a through bore 202 in fluid communication with the through bore 176 of the base unit 151. A shoulder or lip 204 is provided in the bore 202 for abutting by the washer 156, which is used as leverage by the fastener 154 to secure the flywheel 152 to the projection 174 on the base unit 151. However, the threads 220 on the fastener 154 are configured to bottom out before the gap between washer 156 and the lip 204 is fully taken up. This leaves a slight gap and allows the flywheel 152 to still rotate relative to the base unit 151 even after being secured to the base unit by the fastener 154. As further discussed below, this rotational movement allows the base unit 151 of the mandrel 120 to rotate relative to the flywheel 152 to set the lens axis and the axis of the toric zone. For example, the angular position of the offset at the mold section 150 can be set to a particular radian position so that the offset area 136 on the mold section 150 relative to the major axis of the toric zone to be machined or lathed can be established. The fastener 154 has a through bore 206 in fluid communication with the bore 176 of the base unit 151. Thus, vacuum may be provided in the interior cavity 208 of the projection 200 through the bore 206 of the fastener. Once vacuum is turned on and a mold section is placed over the opening of the projection 200, the flywheel 152 is angularly fixed to the base unit 151.

The outer perimeter 210 of the projection 200 is sized and shaped to project into the interior flange section 166 or shoulder 416 of a mold member 150 or 400 (FIGS. 3A and 3B). A slot 212 is provided for receiving the tab or key 164 on the mold member 150 or 400. The slot 212, the key 164, or both can serve as a reference point to orientate the mold section 150 or 400 to the flywheel 152. This reference point allows any corrective feature on the mold section 150 or on the lens button to be arranged so that the corrective feature matches a final contact lens feature formed by the mold section or by the lathing process. For example, a mold section having a toric zone with a major axis and a minor axis can be arranged so that the major axis is aligned with the reference point. The mold section 150 or 400 can be mounted onto the projection 200 of the mandrel and held there by friction or a slight interference between the projection and the interior surfaces of the mold section. A reference point on the base unit 151 and the flywheel 152 can then be aligned. Once proper angular alignment is achieved, as further discussed below, vacuum is applied through the bore of the mandrel 120 and the bore 206 of the fastener to more firmly secure the mold section 150 or 400 onto the flywheel 152 and fix the relative rotation and the angle between the flywheel and the base unit 151 for the duration of the machining step. In another example, the flywheel 152 is equipped with a modified projection so that it holds the outside of the female lens mold, such as the shoulder 156 (FIG. 3A), and the convex lens defining surface faces the cutting tool. The procedure can also involve securing the mold section 400 of FIG. 3B with the lens button 402 onto the mandrel and aligning the tab 164 on the mold section 400 to a desired angular position for machining.

Figure 5:
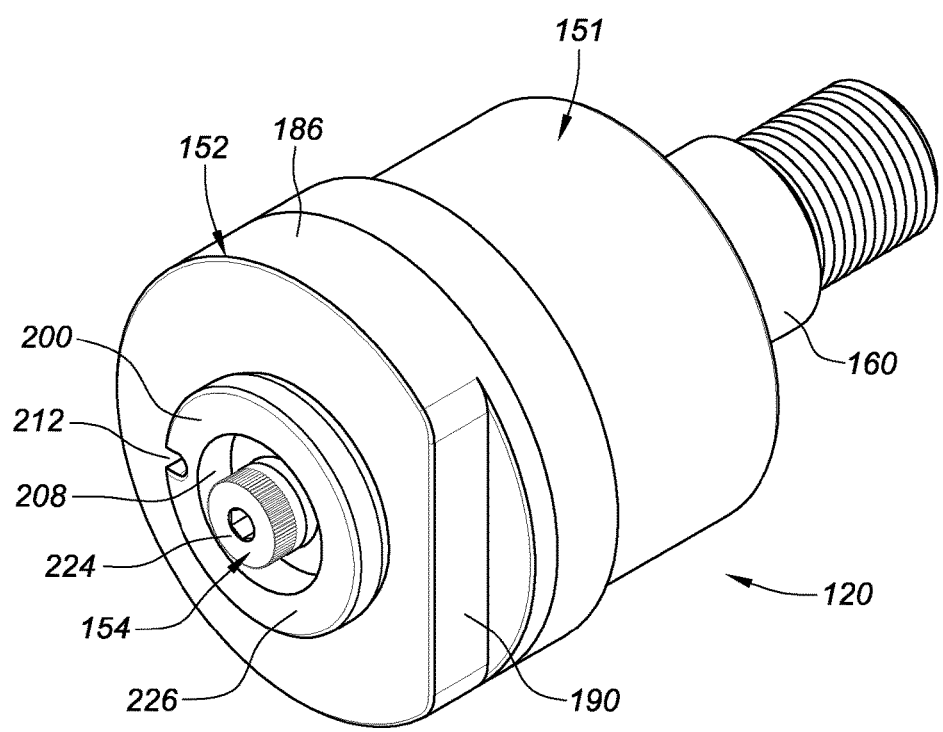
FIG. 5 is perspective view of the mandrel of FIG. 4 in an assembled state.

FIG. 5 shows a perspective view of the mandrel 120 of FIG. 4 in an assembled state. As shown, the fastener 154 is located within the interior cavity 208 of the flywheel 152 with the upper surface of the head 224 of the fastener approximately even with the end surface 226 of the projection 200. In one example, the flywheel 152 is made from a metallic material, such as from stainless steel or aluminum. In another example, the flywheel is molded from a hard thermoplastic material, such as from polycarbonate (PC), acrylonitrile butadiene styrene (ABS), polyetheretherketon (PEEK), or similar hard plastics.

Figure 6:
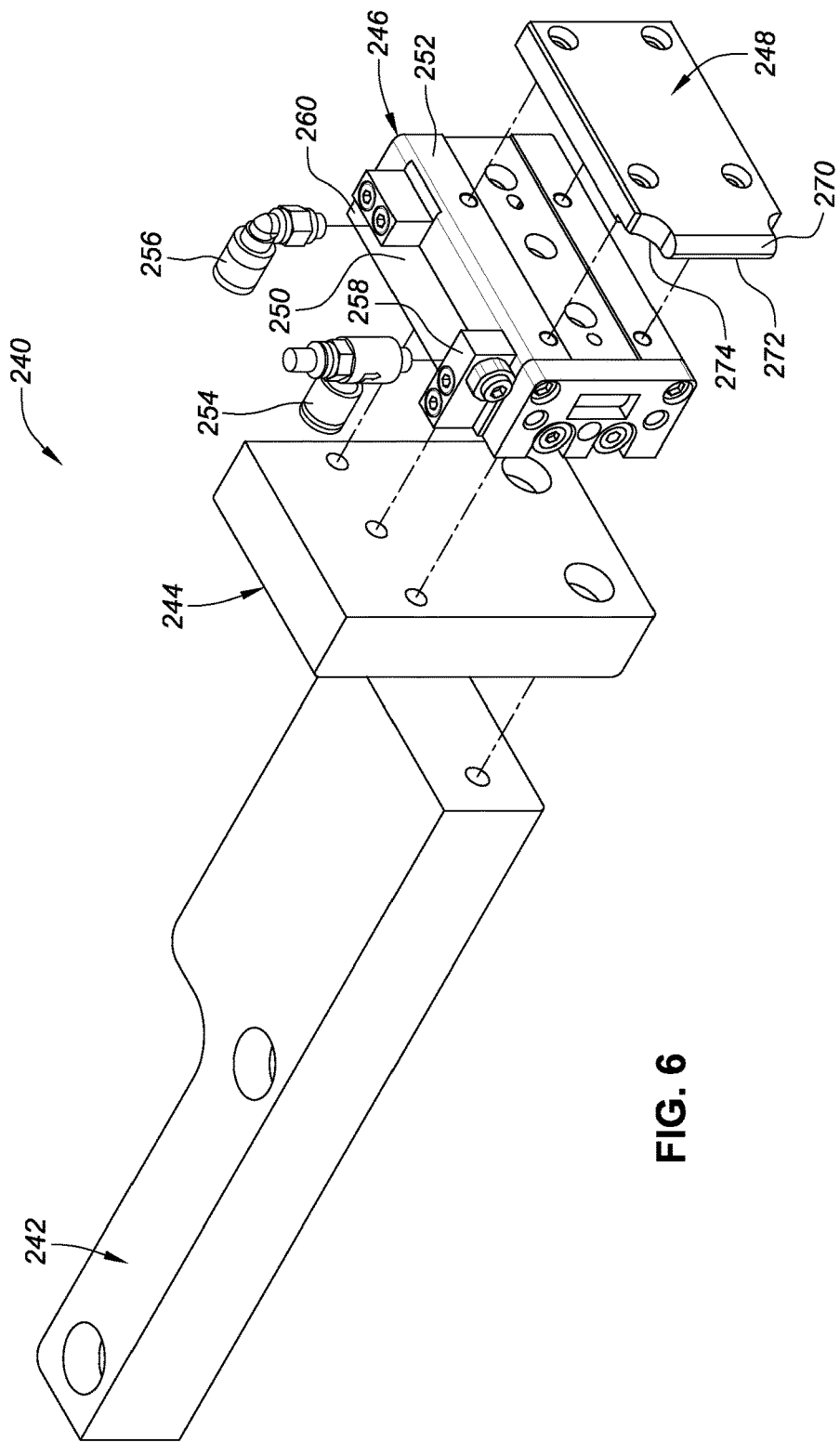
FIG. 6 is an exploded view of an aligner provided in accordance with aspects of the present disclosure.

With reference now to FIG. 6, an aligner 240 is shown for setting the starting or home position of the flywheel 152. For example, when the aligner is pushed against the planar break surface 190 of the flywheel 152, the position of the slot 212 on the flywheel is set to a first radian position, which may also be referred to as a starting or home position. As shown with reference to FIG. 5, the home position of the slot 212 is roughly at a 9 o'clock position when the aligner 240 is actuated against the planar break surface. However, the slot 212 can be set at any angular position relative the planar break surface 190, such as 12 o'clock, 6 o'clock, 3 o'clock, or any other radian coordinate. The angular positions may alternatively be labeled or identified in degree coordinates rather than clock positions.

Figure 8:
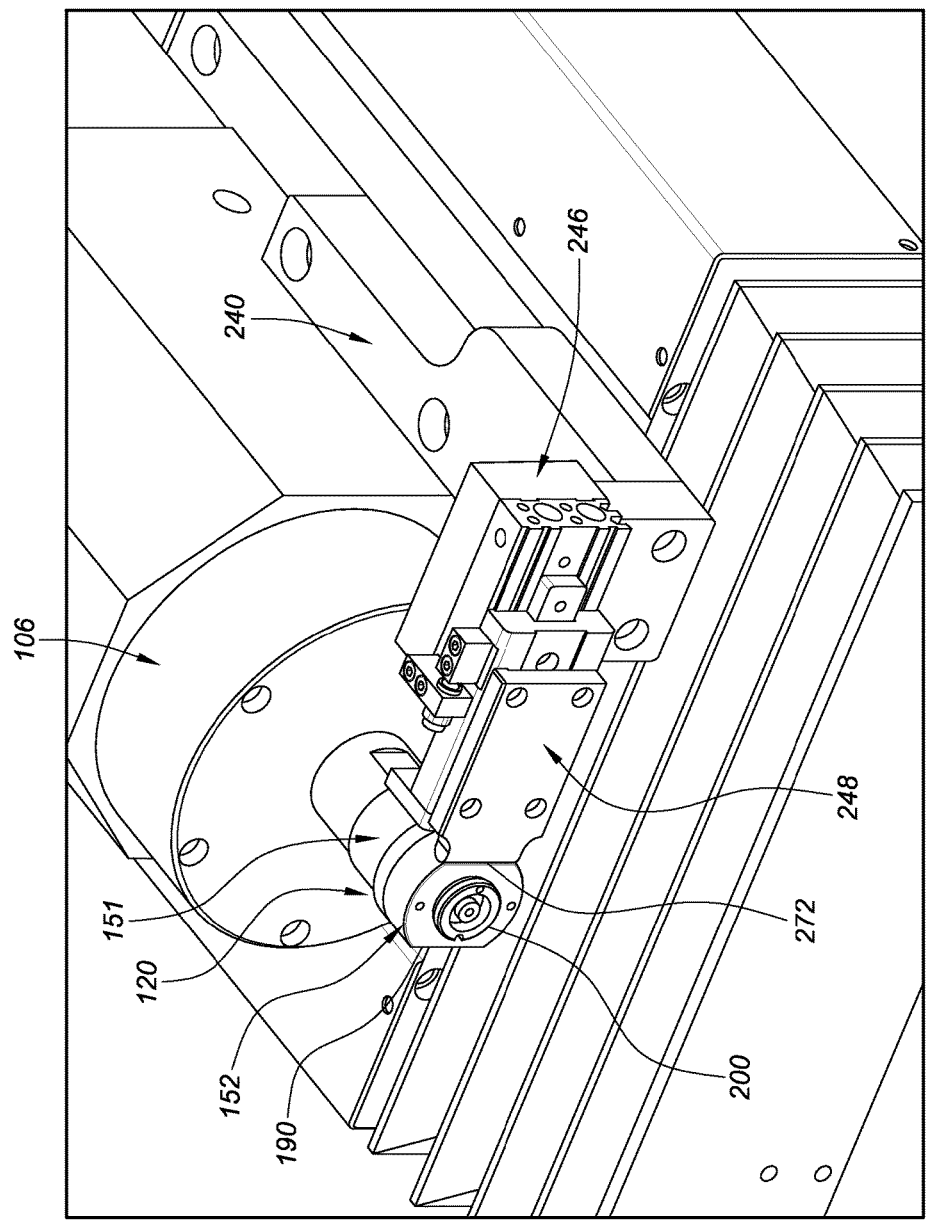
FIG. 8 is a perspective view of a lathe assembly having the mandrel of FIGS. 4 and 5 and the aligner of FIGS. 6 and 7 and in an engaged position.
Figure 9:
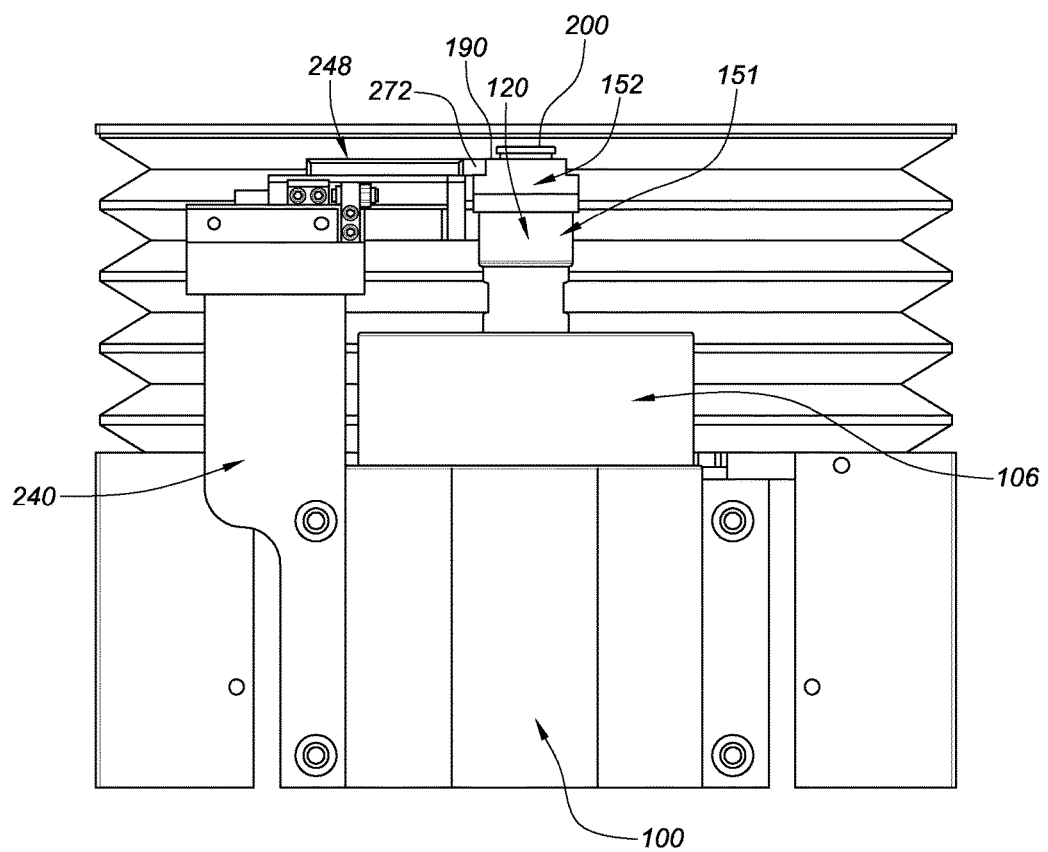
FIG. 9 is top view of the assembly of FIG. 8.
Figure 10:
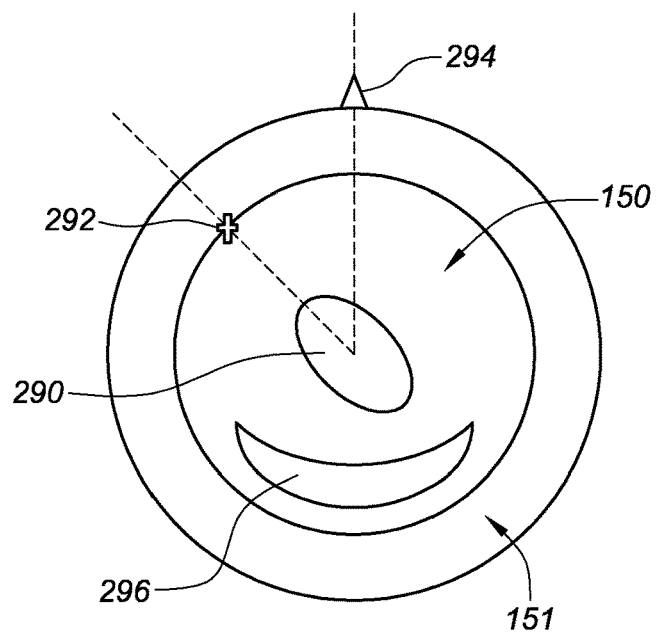
FIGS. 10 and 11 are schematic front elevation views of a mold section mounted onto a mandrel of the present disclosure and the mandrel's capability of angularly aligning two different reference points to a desired radian coordinate so that machining of a specific area on the lens mold section relative to the aligned radian coordinate can be performed.
Figure 11:
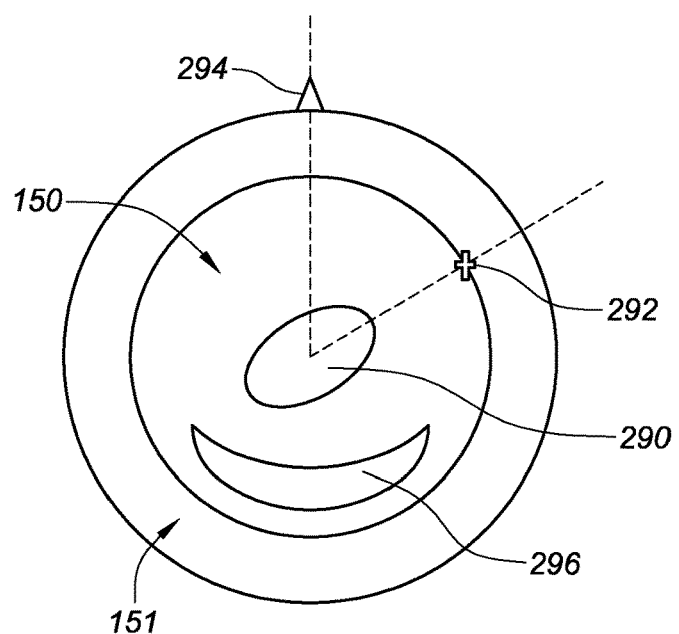

The aligner 240 has a mounting plate 242 for mounting to a frame or surface on the lathe assembly 100, a base plate 244, a pneumatic block 246, and a strike plate 248. The mounting plate 242 and the base plate 244 have a plurality of holes or bores for fastening the two together and to the lathe assembly. The pneumatic block 246 has two block sections, including a stationary block section 250 that is attached to the base plate 244 and a movable block section 252, to which the strike plate 248 is attached. A number of bores, threaded bores, fasteners, and fluid flow channels are provided within the pneumatic block 246 for fluid pressure flow and for securing the various pieces together to form the block 246. A first pneumatic valve 254 is connected to a first flow port 258 and a second pneumatic valve 256 is connected to a second flow port 260. Both flow ports 258, 260 are formed on or are associated with the stationary block section 250. In an example, pressurized air is used as a pneumatic source to actuate the pneumatic block 246. When the first valve 254 is actuated, it moves the movable block 252 to an engaged position (FIGS. 8 and 9). When the second valve 256 is actuated, it moves the movable block 252 to a disengaged position (FIGS. 10 and 11). As the strike plate 248 is attached to the movable block 252, the strike plate 248 moves accordingly. In other examples, the positions of the two valves are reversed so that the first valve 254 moves the movable block to the disengaged position and the second valve 256 moves the movable block to the engaged position. In yet another example, only a single valve is incorporated for actuating the movable block 252. For example, a compression or an extension spring may be used so that upon pressuring the pneumatic block 246, the spring is either compressed or stretched to move the movable block to the engaged position. Subsequently when the pressure is released, the spring returns the pneumatic block to the disengaged position.

The strike plate 248 has a generally rectangular configuration with an extended wedge 270 comprising a break surface 272 having a linear edge. Optional relief surfaces 274 may be provided with the strike plate 248 as well as bores for fastening the strike plate to the movable block 252.

Figure 7:
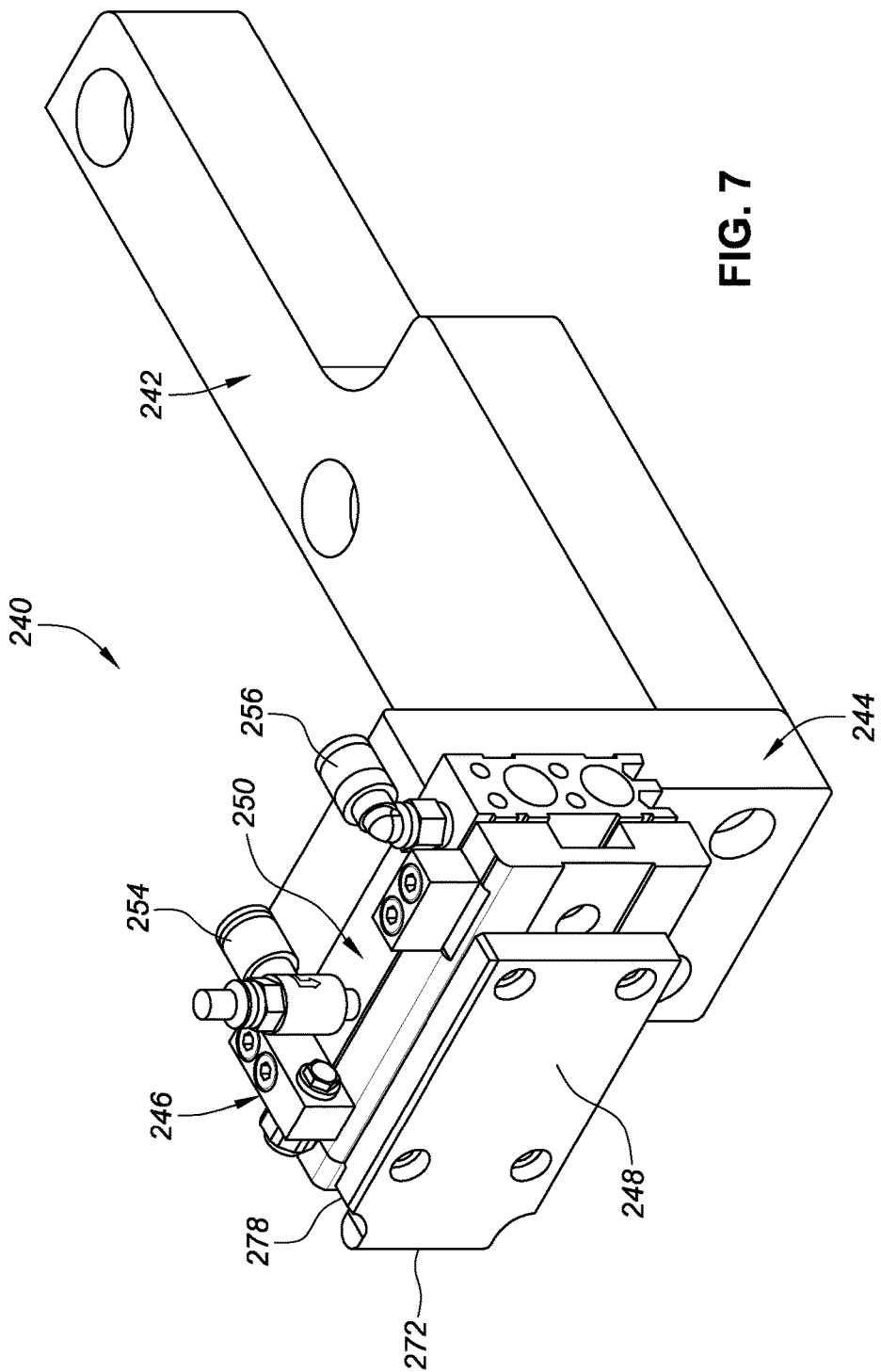
FIG. 7 is a perspective view of the aligner of FIG. 6 in an assembled state.

FIG. 7 shows a perspective view of the aligner 240 in an assembled state. As shown, the linear edge of the break surface 272 extends beyond an end surface 278 of the pneumatic block 246. This configuration is preferred so that when actuated, the linear edge 272 is ensured to contact the planar break surface 190 of the flywheel 152. With reference now to FIG. 8, a perspective view of the lath assembly 100 of FIG. 1 with the mandrel 120 of FIGS. 4 and 5 and the aligner 240 of FIGS. 6 and 7 are shown. In the present view, the flywheel 152 is shown with two planar break surfaces 190 and the pneumatic block 246 of the aligner 240 actuated so that the linear edge of the break surface 272 contacts, such as to touch or abut, one of the two planar break surfaces 190. As previously discussed, this sets the position of the flywheel 152 to a first radian position, otherwise referred to as a starting or home position. For example the flywheel 152 can be equipped with a reference point, such as the slot 212 on the flywheel, so that when the break surface 272 on the strike plate 248 contacts the planar break surface 190, the reference point is established as a starting or home position. Note that the flywheel 152 on the mandrel is shown without a work piece, such as the mold section 150 of FIG. 3A or the mold section 400 with lens button 402 of FIG. 3B, but one is understood to be mounted onto the projection 200 of the flywheel. Further, while the projection 174 on the base unit 151 can be offset from the mandrel central axis, for discussion purposes that follow, the projection 172 has a central axis that is concentric with the central axis of the mandrel and the rotational axis of the lathe assembly but the projection 200 on the flywheel 152 has a central axis that is offset from the central axis of the mandrel. Thus, when the mandrel is rotated to rotate the mold section 150, an offset area 136 (FIG. 2) at a specific radian position is created by the offset, as previously discussed.

At this point, due to the break surface 272 on the strike plate contacting the planar break surface 190 on the flywheel 152, the flywheel is angularly fixed by the break surface 272. However, the base unit 151 of the mandrel 120, which is secured to the chuck 106, is still movable relative to the flywheel. Thus, by moving the chuck 106, such as by rotating the chuck, the base unit 151 on the mandrel 120 can rotate relative to the now fixed flywheel 152. In one example, the base unit 151 can move in 1 to 5 degree increments relative to the flywheel. For example, if a reference point on the flywheel 152 is at zero, a reference point on the base unit 151 of the mandrel can be rotated to some degree relative to the flywheel reference point, such as 20 degrees or negative 20 degrees relative to the flywheel reference point. By allowing the reference point on the base unit 151 to be set relative to the reference point on the flywheel, the location of the offset area 136 can be set relative to any selected radian position on the flywheel. Thus, as an example, if the major axis of a toric zone on a mold section is keyed to the flywheel reference point, setting the base unit 151 reference point relative to the flywheel reference point effectively sets the offset area 136 relative to major axis of the toric zone. This then allows a ballast zone to be machined on the mold section at the offset area 136 and aligned or arranged to a desired angle relative to the major axis of the toric zone. Similarly, this allows the lens button 402 to be machined and for a ballast zone to be formed at the offset area. For example, the stock area 403 (FIG. 3B) area of the lens button 402 may be lathed to form a front or back curve of an ophthalmic lens and the offset area lathed to a different configuration, such as leaving behind lens material, to form a prism ballast.

FIG. 9 is a top view of the assembly of FIG. 8.

FIGS. 10 and 11 show two exemplary angular alignment configurations that can be set using the lath assembly 100 FIGS. 8 and 9. With reference initially to FIG. 10, a mold section 150 having a toric zone 290 molded therewith is shown mounted onto a flywheel 152, which is angularly fixed by the aligner 240, such as that shown in FIGS. 8 and 9. Alternatively, the figure can depict a lens button 402 mounted on a mold section 150 or 400 and the mold section 150 or 400 held by the mandrel. The toric zone 290, which is elliptical in shape and has a major axis and a minor axis, has its major axis aligned to a flywheel reference point 292, which can be a key 164 (FIG. 3A) formed with the mold section 150 or 400, a slot 212 on the flywheel 152 (FIG. 5), or both. The alignment defines a first radian position. The base unit 151 of the mandrel has a reference point 294 that can then be set relative to the flywheel reference point 292 by rotating the chuck to rotate the base unit relative to the flywheel, which is shown to be approximately negative 8 degrees. This then sets a second radian position on the mandrel, which can be the same as or different from the first radian position. The position of the base unit reference point 294 determines the location of the offset area 136 that can be machined and the position of the flywheel reference point 292 determines the position of the major axis relative to the offset area. Vacuum can then be turned on to fix the angular position between the two reference points 292, 294, such as to fix the flywheel 152 relative to the base unit 151. Once fixed, the mold section 150 or 400 or the lens button 402 on the mold section can be machined at the offset area, such as to form a prism ballast zone 296 on the mold section 150 at the offset area to form a prism ballast on a contact lens to be formed by the machined mold section 150. If the arrangement is for a lens button, the back curve may be machined from the stock area 403 (FIG. 3B) of the lens button and the offset area 296 machined to a different configuration, such as leaving behind additional lens material, to form a prism ballast.

FIG. 11 depicts another example of an angular alignment configuration that can be set using the lath assembly 100 with mandrel 120 and aligner 240 of FIGS. 8 and 9. As shown, the flywheel reference point 292 is about 10 degrees from the base unit reference point 294. Once set, the offset area, which can be used to machine a prism ballast zone 296, is established based on the base unit reference point 294 and the major axis of the toric zone is established based on the flywheel reference point 292, which has been adjusted relative to the base unit reference point 294 and therefore the offset area is positioned based on the flywheel reference point 292.

Figure 12:
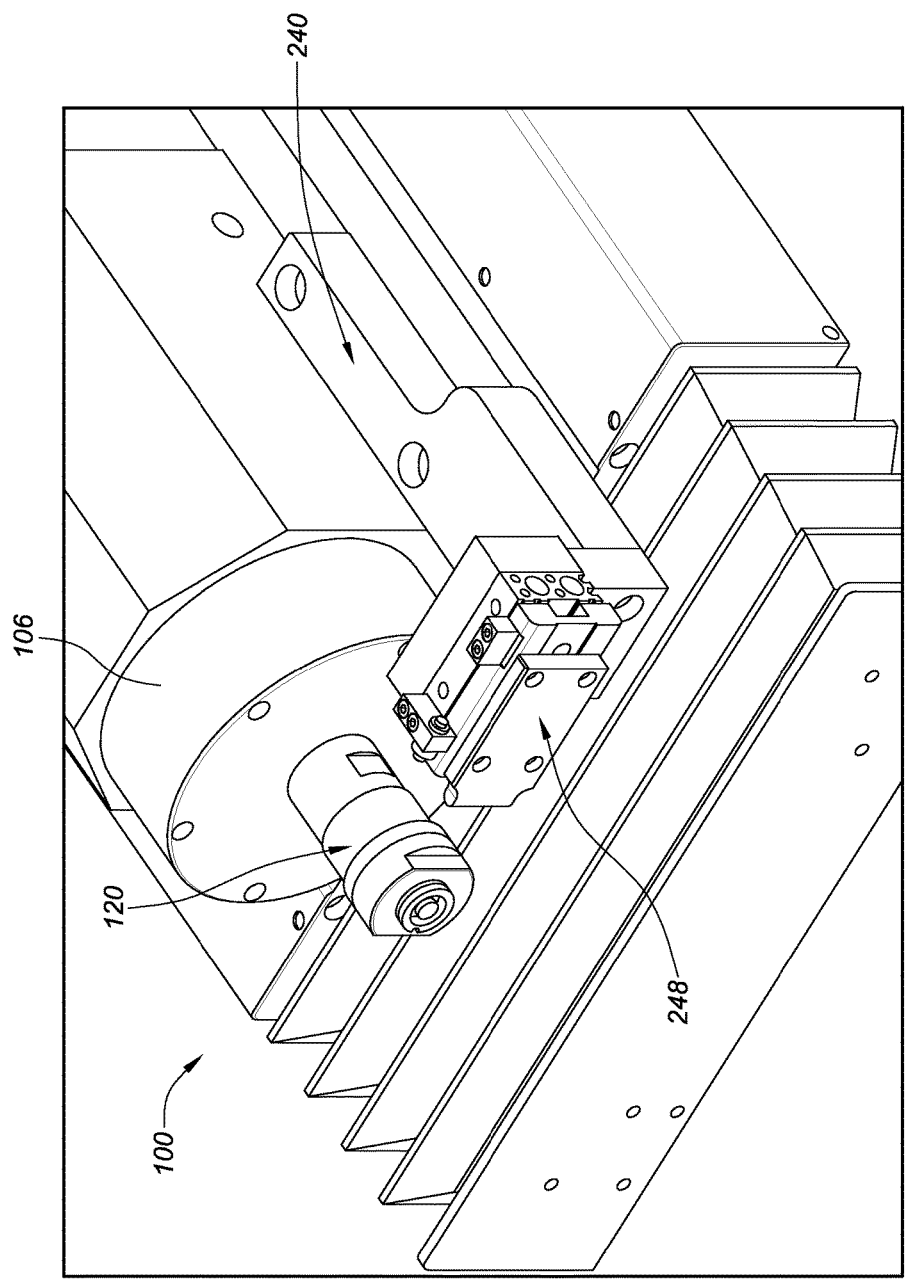
FIG. 12 is a perspective view of the lathe assembly having the mandrel of FIGS. 4 and 5 and the aligner of FIGS. 6 and 7 and in a disengaged position.

FIG. 12 is a perspective view of the lathe assembly 100, mandrel 120, and aligner 240 of the present disclosure with the strike plate 248 in a disengaged position, in which the linear edge is spaced from the flywheel. The mandrel 120 is rotatable by the chuck 106 to rotate the mold section 150 for machining at the offset area to machine a ballast zone 296 (FIGS. 10 and 11).

Figure 13:
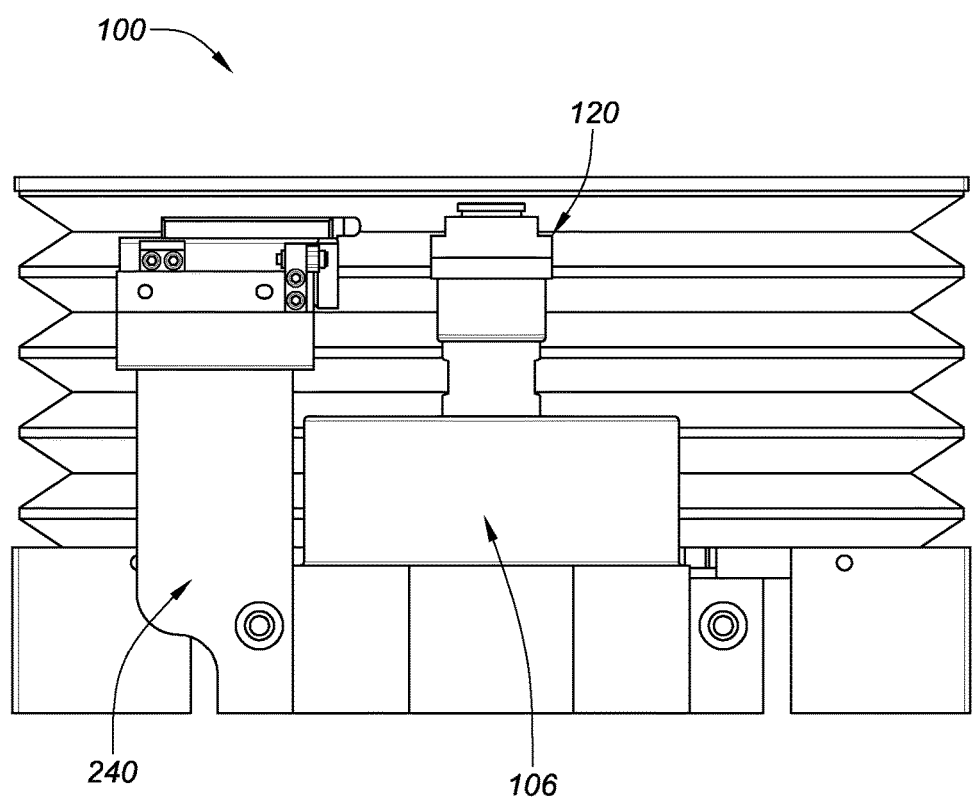
FIG. 13 is assembly top view of the assembly of FIG. 12.

FIG. 13 is a top view of FIG. 12, which shows the strike plate in the disengaged position.

Figure 14:
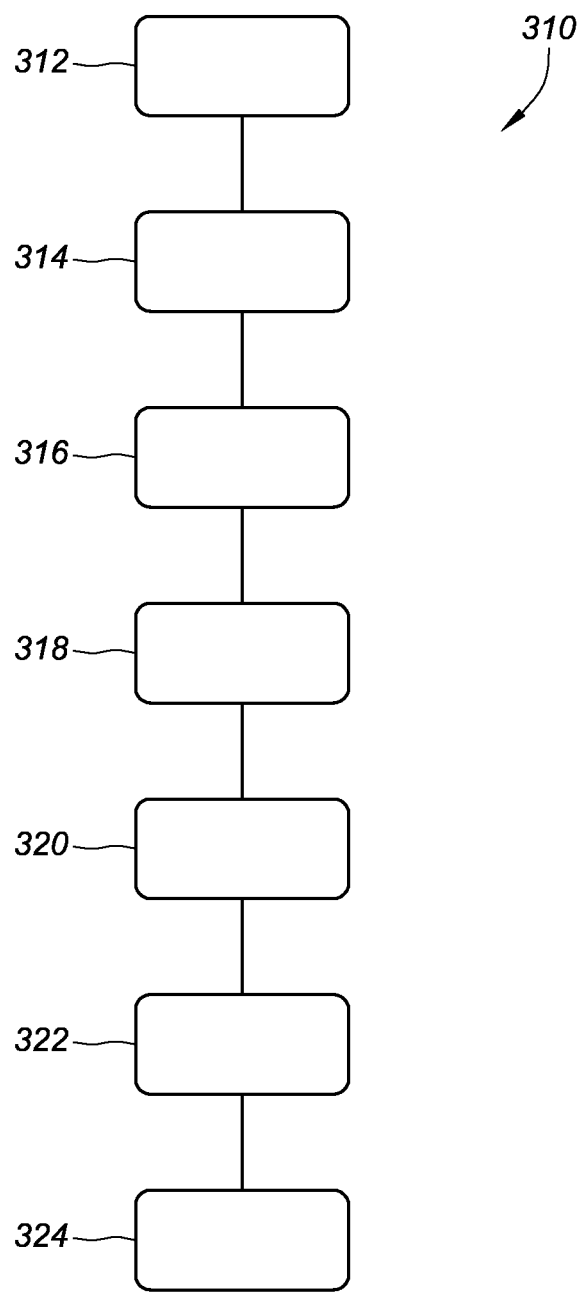
FIG. 14 is a schematic process flow diagram of a method for setting a lens axis using a mandrel of the present disclosure.

FIG. 14 is a schematic method or process 310 for angularly positioning a lens mold section 150 or 400 to a desired lens axis so that a ballast zone can be formed at a specific position on the lens mold section or on a lens button relative to a major axis of a toric zone. The mold section with the machined surface can then be used with a second mold section to form a lens shaped cavity for forming a contact lens when a lens forming material is placed in said lens shaped cavity and polymerized. If the machining is performed on the lens button mounted on a mold section, the completed ophthalmic lens curve can be formed by the disclosed process.

In accordance with aspects of the present process 310, a lens mold section is first placed onto a mandrel, which has a base unit and a flywheel, and the mandrel is attached to a chuck on a lathe machine at 312. In some examples, the mold section is placed onto the flywheel after the mandrel is attached to the chuck. The mold section has an integrally molded elliptical area defining a toric zone, which has a major axis and a minor axis. In another example, the mold section has a lens button located thereon having a posterior lens surface having a toric zone, which has a major axis and a minor axis. The mandrel has a lengthwise axis and a projection on the flywheel that has a rotational axis that is offset from the rotational axis of the lathe assembly.

The major axis of the toric zone is aligned to a flywheel reference point at 314, which sets a first radian position. As previously disclosed, a key on the mold section, a notch on the flywheel, or both the key and the notch can be used as the reference point for setting the first radian position.

At 316, the flywheel is fixed from angular rotation by an aligner. In one example, air pressure is used to actuate a pneumatic block to move a break surface on a strike plate of the aligner against a planar break surface on the flywheel to fix the flywheel from rotating.

At 318, the base unit is rotated relative to the flywheel to fix the angular position of the base unit reference point relative to the flywheel reference point. This establishes a second radian position.

At 320, vacuum is applied to fix the relative positions of the flywheel and the base unit and to firmly secure the mold section to the flywheel.

At 322, the strike plate on the aligner is disengaged from the flywheel so that rotation of the chuck rotates both the flywheel and the base unit of the mandrel.

At 324, a cutting tool is used to machine an offset area created by the offset rotation of the mold section or of the lens button. For example, the cutting tool may be used to cut a prism ballast at the offset area, said prism ballast area being dependent on the major axis of the toric zone. For an embodiment with a lens button, a cutting tool is used to machine the stock area of the lens button until a front curve or anterior surface of a contact lens is formed. Further, a prism ballast is also machined from the original stock area of the lens button and to a different configuration than the machined curvature of the anterior surface of the ophthalmic lens, the location of which is dependent on the alignment of the major axis of the toric zone. The process can then continue at step 340 of FIG. 15.

Figure 15:
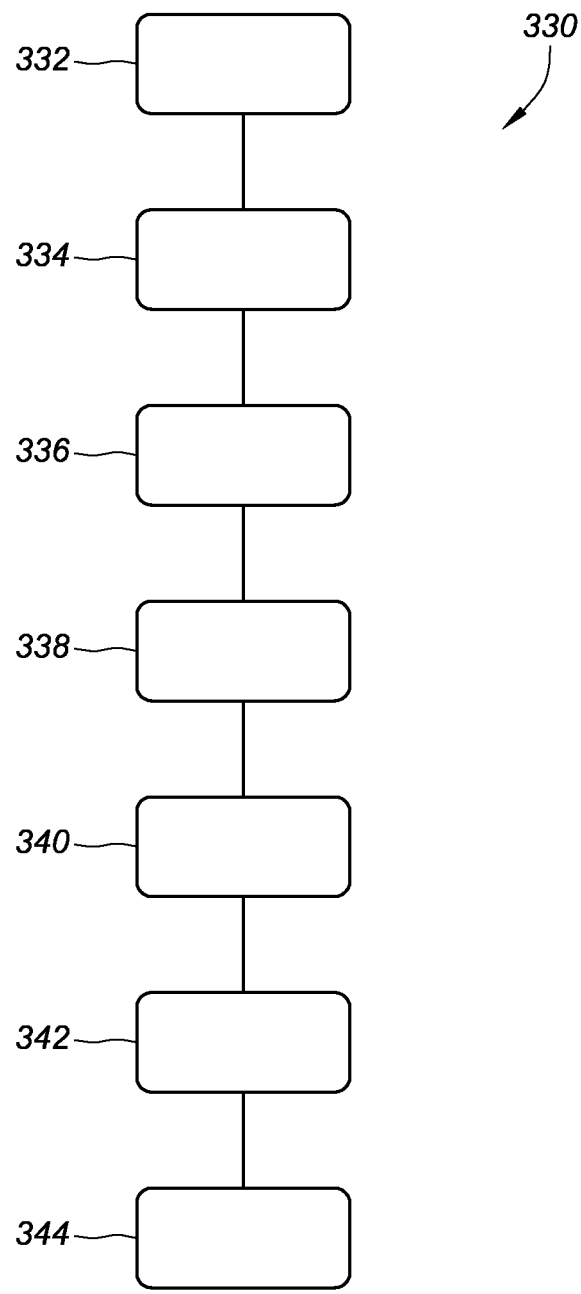
FIG. 15 is a schematic process flow diagram of a method for making an ophthalmic lens using a lens mold section that has been using a lathe assembly with a mandrel of the present disclosure.

FIG. 15 is a schematic method or process 330 for forming an ophthalmic lens using a mold section with a toric zone and a ballast zone machined in accordance with aspects of the presently disclosed process, such as process 310 of FIG. 14. At step 332, the mold section with a machined convex surface is used with a second mold section with a concave lens forming surface. In other examples, a female mold section with a machined concave lens defining surface is used with a male mold section having a convex lens defining surface.

At step 334, lens forming material is added to the concave mold section and the two mold sections are engaged to retain the lens forming material in a lens cavity defined by the two engaged mold sections.

At step 336, the lens forming material is polymerized to form an ophthalmic lens. To polymerize the lens forming material, it can be irradiated with light, such as ultraviolet light or visible light, or heat exposure or some other nonthermal method may be employed to cure the lens forming material.

At step 338, the two mold sections are de-molded, that is separated from one another.

At step 340, the ophthalmic lens is then delensed either in a dry state without exposure to liquid or a wet state by exposing the ophthalmic lens to a liquid.

At step 342, the ophthalmic lens is washed, such as to extract unreacted polymer, hydrate, or both.

At step 344, the ophthalmic lens is inspected and packaged in a blister pack with a storage solution and sealed.

Although limited embodiments of methods for making ophthalmic lens mold sections and components and devices used in the methods have been specifically described and illustrated herein, many modifications and variations will be apparent to those skilled in the art. Accordingly, it is to be understood that the methods for making ophthalmic lens mold sections and components and devices used in the methods according to principles of the disclosed devices, systems, and methods may be embodied other than as specifically described herein. The disclosure is also defined in the following claims.

What is claimed is:

1. A method for producing an ophthalmic lens, comprising:
   providing a plastic mold section having a lens button with a posterior surface comprising a toric zone with a major axis;
   mounting the plastic mold section onto a mandrel, said mandrel having a flywheel, a base unit, and a projection having a rotational axis that is offset from a rotational axis of a lathe assembly;
   fixing the flywheel to a first reference point with an aligner so that the first reference point is at a first radian position;
   rotating the base unit relative to the flywheel so that a second reference point is at a second radian position; and
   using vacuum to fix the flywheel and the base unit from rotating relative to one another.

2. The method of claim 1, wherein the first radian position corresponds to an axis position of the major axis.

3. The method of claim 1, wherein the step of fixing the flywheel to the first reference point comprises actuating an aligner.

4. The method of claim 3, wherein the aligner has a strike plate that translates when the aligner is actuated.

5. The method of claim 3, wherein the aligner comprises a pneumatic block comprising a stationary block and a movable block that moves relative to one another when the aligner is actuated.

6. The method of claim 3, wherein the step of fixing the flywheel and the base unit from rotating relative to one another further comprises using mechanical fasteners.

7. The method of claim 1, wherein the second radian position sets an area on the lens button to be machined by a cutting tool.

8. The method of claim 7, wherein the area to be machined corresponds to a ballast zone.

9. The method of claim 1, further comprising machining the lens button to form a front curve of the ophthalmic lens.

10. A method for producing an ophthalmic lens, comprising:
providing a plastic mold section having a lens button with a posterior surface having a toric zone with a major axis;
mounting the plastic mold section onto a projection on a mandrel, said mandrel having a flywheel, a base unit, and the projection has a rotational axis that is offset from a rotational axis of a lathe assembly;
fixing a reference point on the flywheel to a first radian position;
rotating the base unit relative to the flywheel so that a second reference point on the base unit is at a second radian position; and
applying a vacuum to fix the flywheel and the base unit from rotating relative to one another.

11. The method of claim 10, wherein at least part of the plastic mold section is exposed to the vacuum.

12. The method of claim 10, wherein vacuum is applied through a bore that runs lengthwise through the mandrel.

13. The method of claim 10, wherein the first radian position corresponds to an axis position of the major axis.

14. The method of claim 10, wherein the second radian position sets an area on the mold section to be machined by a cutting tool.

15. The method of claim 14, wherein the area to be machined is a ballast zone.

16. A method for producing an ophthalmic lens, comprising:
providing a plastic mold section having lens button with a posterior surface having a toric zone with a major axis;
mounting the plastic mold section onto a mandrel, said mandrel having a flywheel, a base unit, and a projection having a rotational axis that is offset from a rotational axis of a lathe assembly;
setting the major axis of the toric zone to a first radian position by fixing the flywheel from rotating;
setting a reference point on the base unit of the mandrel to a second radian position, which sets an area on the lens button to be machined by a cutting tool;
fixing the first radian position and the second radian position relative to one another;
rotating the mandrel with the first radian position and the second radian position fixed to one another; and
wherein the fixing step comprises a vacuum.

17. The method of claim 16, wherein the area on the lens button to be machined comprises a ballast zone.

18. The method of claim 16, further comprising machining the lens button to form an anterior surface of the ophthalmic lens.

19. The method of claim 18, further comprises packaging the ophthalmic lens in a storage solution inside a cavity of a lens package.

20. A method for producing an ophthalmic lens, comprising:
providing a plastic mold section having a lens button with a posterior surface comprising a toric zone with a major axis;
mounting the plastic mold section onto a mandrel, said mandrel having a flywheel, a base unit, and a projection having a rotational axis that is offset from a rotational axis of a lathe assembly;
fixing the flywheel to a first reference point by actuating an aligner so that the first reference point is at a first radian position;
rotating the base unit relative to the flywheel so that a second reference point is at a second radian position;
fixing the flywheel and the base unit from rotating relative to one another; and
wherein the aligner comprises a pneumatic block comprising a stationary block and a movable block that moves relative to one another when the aligner is actuated.

21. The method of claim 20, further comprising machining the lens button to form a front curve of the ophthalmic lens.

* * * * *

UNITED STATES PATENT AND TRADEMARK OFFICE
CERTIFICATE OF CORRECTION

PATENT NO. : 10,029,432 B2
APPLICATION NO. : 14/921632
DATED : July 24, 2018
INVENTOR(S) : John Leone Page 1 of 1

It is certified that error appears in the above-identified patent and that said Letters Patent is hereby corrected as shown below:

In the Specification

In Column 8, Lines 6-14, delete "Although the flange 168 and the base body 162 are generally round in shape, other shapes are contemplated without deviating from the spirit and scope of the present disclosure. The mandrel 120 may be made from a metal material, such as from steel or aluminum material. Optionally, the mandrel may be made from a hard thermoplastic material, such as polycarbonate (PC), acrylonitrile butadiene styrene (ABS), polyetheretherketon (PEEK), or similar hard plastics." and insert the same on Column 8, Line 5, after "therebetween." as a continuation of the same paragraph.

In Column 11, Lines 8-38, delete "With reference now to FIG. 8, a perspective view of the lath assembly 100 of FIG. 1 with the mandrel 120 of FIGS. 4 and 5 and the aligner 240 of FIGS. 6 and 7 are shown. In the present view, the flywheel 152 is shown with two planar break surfaces 190 and the pneumatic block 246 of the aligner 240 actuated so that the linear edge of the break surface 272 contacts, such as to touch or abut, one of the two planar break surfaces 190. As previously discussed, this sets the position of the flywheel 152 to a first radian position, otherwise referred to as a starting or home position. For example the flywheel 152 can be equipped with a reference point, such as the slot 212 on the flywheel, so that when the break surface 272 on the strike plate 248 contacts the planar break surface 190, the reference point is established as a starting or home position. Note that the flywheel 152 on the mandrel is shown without a work piece, such as the mold section 150 of FIG. 3A or the mold section 400 with lens button 402 of FIG. 3B, but one is understood to be mounted onto the projection 200 of the flywheel. Further, while the projection 174 on the base unit 151 can be offset from the mandrel central axis, for discussion purposes that follow, the projection 172 has a central axis that is concentric with the central axis of the mandrel and the rotational axis of the lathe assembly but the projection 200 on the flywheel 152 has a central axis that is offset from the central axis of the mandrel. Thus, when the mandrel is rotated to rotate the mold section 150, an offset area 136 (FIG. 2) at a specific radian position is created by the offset, as previously discussed." and insert the same on Column 11, Line 9, as a new paragraph.

Signed and Sealed this
Second Day of April, 2019

Andrei Iancu
*Director of the United States Patent and Trademark Office*